United States Patent [19]
Knapp

[11] Patent Number: 5,989,361
[45] Date of Patent: Nov. 23, 1999

[54] V.E.T. VIDEO ENHANCEMENT TREATMENT

[76] Inventor: John W Knapp, 684 Invergarry St., Glendora, Calif. 91741

[21] Appl. No.: 08/823,331

[22] Filed: Mar. 22, 1997

Related U.S. Application Data

[60] Provisional application No. 60/013,998, Mar. 25, 1996.
[51] Int. Cl.⁶ .................................................. B08B 7/00
[52] U.S. Cl. ................................. 134/42; 134/40; 134/6
[58] Field of Search ............................. 134/42, 40, 26, 134/6, 32, 39, 2

[56] References Cited

U.S. PATENT DOCUMENTS

| | | | |
|---|---|---|---|
| 4,183,819 | 1/1980 | Stolove | 510/167 |
| 4,529,531 | 7/1985 | Padovani | 508/280 |
| 4,530,772 | 7/1985 | Timony | 508/282 |
| 4,544,413 | 10/1985 | Boots et al. | 106/287.14 |
| 5,145,523 | 9/1992 | Halpin et al. | 510/407 |
| 5,181,965 | 1/1993 | Bakanowsky, III | 134/8 |
| 5,238,504 | 8/1993 | Henry | 134/40 |
| 5,420,729 | 5/1995 | Lee et al. | 360/69 |
| 5,607,512 | 3/1997 | Grout | 134/6 |
| 5,811,380 | 9/1998 | Wetz | 510/175 |

OTHER PUBLICATIONS

Williams, Guide to VCRs, Camcorders & Home Video, Clinton Book Company, pp. 65–66, 1990.
Williams, All Thumbs Guide to VCRs, Tab Books, pp. 55–65, 1993.

*Primary Examiner*—Jill Warden
*Assistant Examiner*—Alexander Markoff

[57] ABSTRACT

A method for cleaning and conditioning tape path surfaces and heads of video and audio equipment, recorders, and electrical contact surfaces of electronic equipment, improving the resolution of said heads comprising: providing a cleaning composition consisting essentially of white mineral oil, a compound selected from the group of mineral spirits, hydrotreated heavy petroleum naphtha, heavy alkylate naphtha and isoparaffinic hydrocarbons having 1–13 carbons; with application to said tape path surfaces and the heads of said video and audio equipment, said tape recorders, and the electrical contact surfaces of said electronic equipment, causing the deep cleaning and conditioning for an improved life and improved results of said recorders and said electronic equipment.

33 Claims, 1 Drawing Sheet

VCR TAPE PATH

VCR TAPE PATH

V.E.T. VIDEO ENHANCEMENT TREATMENT

The application claims the benefit of U.S. Provisional application Ser. No. 60/013,998, filed Mar. 25, 1996.

BACKGROUND OF THE INVENTION

1. Field of The Invention

This invention relates to a method for cleaning and conditioning tape path surfaces and heads of audio and video recording equipment, and providing improvements to electrical contact surfaces with a fluid composition. This invention is about a deep surface cleaning method for video and audio recorders, VTRs, VCRs and contact surfaces of electronic connections. This invention is about removing dirt, deeply deoxidizing contact surfaces, reducing friction, polishing, increasing signal transfer, improving electrical conductivity, increasing resistance against rust and corrosion and resistance against recording tape residue attachment to heads, tape paths and electrical contact surfaces, increasing the life of the heads and contact surfaces. This invention is about a method in which the cleaning and conditioning treatment results in an improvement upon treated surfaces, by penetrating tape oxides and dirt for removal, an unexpected deep surface deoxidization, a polishing of tape path and electrical contact surfaces, and a surface friction reduction. This invention is about unexpected improvements caused by the invented treatment to video and audio recorders, VTRs, VCRs, heads, and electrical contact surfaces and improvement to electronic signal transfer, improving electrical conductivity, enhancing video and audio tape recordings, and supporting and maintaining maximum results upon video and audio recording equipment. Particular attention is noted to the enhanced video and audio signals in VTRs/VCRs after an application of this invention. This invention also relates to the efficient maintenance of other electronic parts, including electrical switches and contacts, both moving and stationary. Greatly enhanced contact efficiency is the result for circuit boards, computer boards, computer chips, connections to sockets; and electrical, video), and audio cable connections. This invention provides superior cleaning and conditioning results over other existing methods and is used for professional, industrial and consumer VTRs/VCRs, tape recorders, heads and electrical contact surfaces. Application includes a conditioning treatment to contact surfaces for cable connections, switches, PC pegs, chip pins and computer chips. This invention is about the application of single chain hydrocarbons as a safer, and non toxic chemistry, for the invented video enhancement treatment, electronics cleaner and contact surface conditioner.

2. Description of Prior Art

Video/audio tape recorders require cleaning. As recording tape is used in a video/audio tape recorder. VTR/VCR, or camcorder (hereinafter referred to as a recorder), the tape leaves behind tiny particles of dirt, oxide, and binder. As dirt and other substances cling to the components built into the tape path, the ability of the recorder to accurately record or play back a signal is significantly reduced. Dirty recorders' heads become less sensitive in reproducing the desired quality in video or audio. If the buildup of residues is allowed to remain on the recording components without attention, they can become part of the recorders' heads, drums and pins. In this case the quality of video image, and sound, will continue to diminish until the recorders' record and playback fails to produce picture or sound. In addition, it is well known that the exposed surfaces of most electrical contacts, selected from the group consisting of metallic, aluminum, solid conductive surfaces and brass are prone to attract oxygen atoms, which leads to the formation of metallic oxides on exposed metals, causing oxidation. Metal oxides are poor conductors and can build up on electronic components, such as upon recorders' heads, causing a reduction between contact surfaces required for best reproduction of tape recordings. Capstan drive pins are especially prone to oxide build up, and get bumpy and uneven, reducing recording quality. Without removal with an effective cleaner the taped results become progressively degraded. Oxidation of video recorders' drums and heads will lead to an increase in friction between the tape and recording components, reducing image quality, as well as causing premature wear on drums and heads. The recording tape will also deteriorate more rapidly from increased friction. The primary parts requiring cleaning, within the video recorders' tape path, include the drums, both stationary and spinning, the drum heads, video and audio heads, stationary heads, the capstan drive pin, rollers, and multiple guide pins. One existing method for cleaning cassette recorders is the use of a cleaning cassette. Although easy to use, this is the least effective method, because it cannot match the quality of hand-cleaning with a cleaning fluid and wipes. The cleaning cassettes cannot possibly reach all the dirty area within the tape path and does not properly clean the capstan drive pin nor other tape path areas where the cleaning cassette tape does not reach. All parts within the tape path affect the recording and playback results, thus the entire tape path needs to be cleaned. Cleaning cassettes have also been known to leave behind harmful deposits. Some can even make the recorder dirtier. The cleaning cassettes method also tends to wear out recorders early, due to friction, especially against drum heads. Of course, there is little human control with this method. This is a blind method of recorder maintenance. Many delicate recording heads, referred to as flying heads, have been broken simply because a cleaning cassette was used. Some video recorders have built-in head cleaning devices that clean by means of friction against the upper, spinning head drum. Only the upper drum, and heads contained in the upper drum, become potentially cleaned with this method. This method fails to clean the entire tape path. Some use a flicking method from a spongy roller against the drum heads for foreign materials removal. Another built in cleaning device uses a more firm, stretched material against the upper drum assembly, with electronic sensors to test the signal. This method fails to clean the entire tape path. It does not enhance the heads The effectiveness of the existing, built in, tape path cleaning device does not clean with the effectiveness of the hand cleaning method; and more so when compared to the invention cleaner and method. This is because, first, only the head drums receive the cleaning attention, and thus fails to clean all the tape path. Manual cleaning is the primary method used by the professional video production industry. Although some major manufacturers of video cassette recorders, including camcorders, supply a cleaning cassette tape with new equipment, most certified, professional servicing technicians know to open the recorder, and clean by hand. The cassette cleaning method can he useful in a head-clog emergency, during a shoot or editing session, but is not a method that will enhance the conditions of, nor increase the life of a video recorder; but rather put the video recorder at risk. Again, this can be referred to as a "blind" method because the user cannot see all that is going on. This method fails, as compared to the invention, because it is only a casual method of cleaning the recorder and takes control away from the user. Manual cleaning the tape path of VTR/VCRs is the most effective method, but when done with existing products and methods on the market, still fails to match the invention. Existing electronic cleaning fluids are used to remove dirt, tape residues and other foreign particles from tape paths. Some cleaners have been officially removed from use due to hazards to health, or are of environmental and financial concern, such as Freon®), an ingredient in some existing electronic cleaning applications, some have proven to be carcinogenic. Acetone is a quick to use cleaning solvent, but is a health risk to the user, and high risk to electronic components such as delicate electronic heads, potentially dissolving lacquer. Alcohol and/or other solvents, without oils, are used to make up most existing electronic cleaning fluids. Alcohol, in various forms, is liked by most technicians and is traditionally accepted as the safest of existing electronic contact cleaners because it is pleasant and easy to use, plus dries rapidly. The inventor has found that the use of alcohol, alone, as a cleaner for recorders and electrical contact surfaces is a cause for excellerated oxidation and corrosion. Although commonly used in the video, computer, and electronics industry, many technicians are not aware that alcohol cleaning can bring negative results to metallic surfaces. Technicians have found that after alcohol is used to clean recording heads, tape paths, and electrical contacts, a slow, but continued increased frequency in cleaning is also required. The inventor has found that one reason for the increased and needed frequency in cleaning is because the alcohol cleaner does not remove all oxidants upon treated surfaces, and leaving cleaned surfaces unprotected, and open to oxidation The unexpected invention resolves the alcohol problem, as it cleans deeper than alcohol, alone, removing oxidation and corrosives even out of reach from the alcohol cleaner, leaving treated surfaces with a protective finish, and a resistance against oxidation, corrosion, dirt attraction; including reduced friction. So if alcohol is used as an electronics cleaner, it should be followed up the invented cleaning method in order to condition and protect the cleaned surfaces. It has been well known that alcohol causes hardening and cracking of rubber rollers, such as capstan pinch rollers used in VTRs/VCRs and all known tape recorders. This is resolved with the invention, as the invented treatment is safe for use on rubber, and lightly cleans and conditions rubber, increasing it's life; making it useful for cleaning and conditioning VTR/VCR pinch rollers. Dropouts in video, plus video noise, identified as intermittent lines and little spots on the video screen during a video tape playback, can temporarily be resolved with a thorough cleaning of heads and tape path. The invented cleaner reduces video drop out and video noise better than existing cleaners, causing an enhanced, clearer video image. Video image enhancement is particularly noticeable in VHS recordings made on VTR I VCRs treated and condition with the invented treatment, as video noise is inherent to the VHS format. Noise reducing circuitry has existed, and continues to be developed, but existing noise reducing circuitry is limited to the single electronic system it is installed in. The invented cleaner, conditioner, is readily applied to any and all existing recorders, providing opportunity for entire studios of recorders, and related electronic equipment to be cleaned and conditioned. Audio tape recorders also need maintenance cleaning. There are some impressive cleaners, of which few are environmentally safe, that clean well, but do not resolve all the tape path problems, nor do they enhance electronic heads. Most cleaners have done what the basic intention of cleaners is for, which is to clean; but conventional cleaners fail to remove deeply embedded corrosive oxidants that are hidden in the surface of electronic heads, drums, and metallic parts that touch the tape during a recording and playback of a tape. They temporarily reduce friction at the tape path. Friction causes heat and begins to wear down both the tape and the tape path surfaces It is known that video and audio recorders that are cleaned routinely last longer than those that ate not cleaned. Existing cleaners are helpful, temporarily, but again oxidation begins it's work. In addition to recording equipment maintenance, the cleaning of video and audio cable connections bring improved signal results. Signal loss occurs most often at cable connections. A non-corrosive, and environmentally safe electronics cleaner is a desirable and useful item. The instant invention brings resolve to this need.

SUMMARY OF THE INVENTION

This invention is a method for cleaning, and conditioning VTR/VCR tape path surfaces and heads of video/audio tape recorders, as a means for improved maintenance; since oxidation, friction, and deterioration, are a natural occurrence. The invented video and electronics application of an environmentally acceptable, simple chain hydrocarbons composition, providing a method for cleaning, deoxidizing, and surface conditioning of materials common to recorders, which includes heads and components that are made of metallic, glass, plastic, rubber and lacquered surfaces. This includes treatment to multiple forms of electronic, and magnetic, heads; tape path surfaces, drums, capstan drive pins and rollers, and electrical contact surfaces, for improved performance. Particular attention is noted as to the unexpected improvement caused to VTRs/VCRs and upon resulting video and audio recordings after application of the invented enhancement treatment. In addition, this invention is a method for cleaning, and conditioning electrical contacts and switches, moving or stationary, circuit boards, computer boards, computer chips, and electrical cable connections. The invention causes a remarkable improvement in electrical conductivity upon conductive surfaces, which is of particular benefit to video/audio tape recorders and related electronic equipment. This invented method and conditioning treatment is useful for both the preparation of new recorders and electronic contact surfaces, and for the maintenance of existing recorders and electronic contact surfaces. This invention brings resolve to a tentative damage caused by alcohol contact cleaner. This invention can be used in conjunction with, or as a follow-up treatment after the use of alcohol as a head and/or electrical contact cleaner, etc. Application of the invention method for multiple electronic treatment uses becomes apparent and the above description and examples should not be construed as limitations on the scope of the invention. Many other variations are possible. Accordingly, the scope of the invention is determined by the claims and their legal equivalents. An application of the invented method and treatment provides an increase in time between repeated maintenance cleanings of VTR/VCR tape paths, with particular increase indicated after the second or third application.

BRIEF DESCRIPTION OF DRAWING

In reference to patent drawing number 1. Titled "Treated Parts In VCR Tape Path." A transparent view represents a generic existing video cassette recorder indicating parts within a common VCR which come in contact with the video tape. Listed are the tape path components that are cleaned and conditioned with the invented method and cleaning composition as indicated in the drawing:

1. Tape guide pins, including movable upon a track tape transport pins, tape tension pin or pins, stationary, non movable pins, and metallic capstan drive pin, which spins during VCR operation, which is always located next to a rubber capstan pinch roller, which presses against the metallic capstan drive pin during normal VCR operation.
2. Tape transport rollers made of plastics and/or metal, against which tape rides during VCR operation.
3. A head drum assembly, which includes an upper and a lower drum.
4. The upper drum heads, which vary in number. Extreme care is required here as drum heads are miniature and easily broken.
5. The stationary audio and tracking heads, in one assembly.
6. The erase head.

DETAILED EMBODIMENTS

Figure 1:
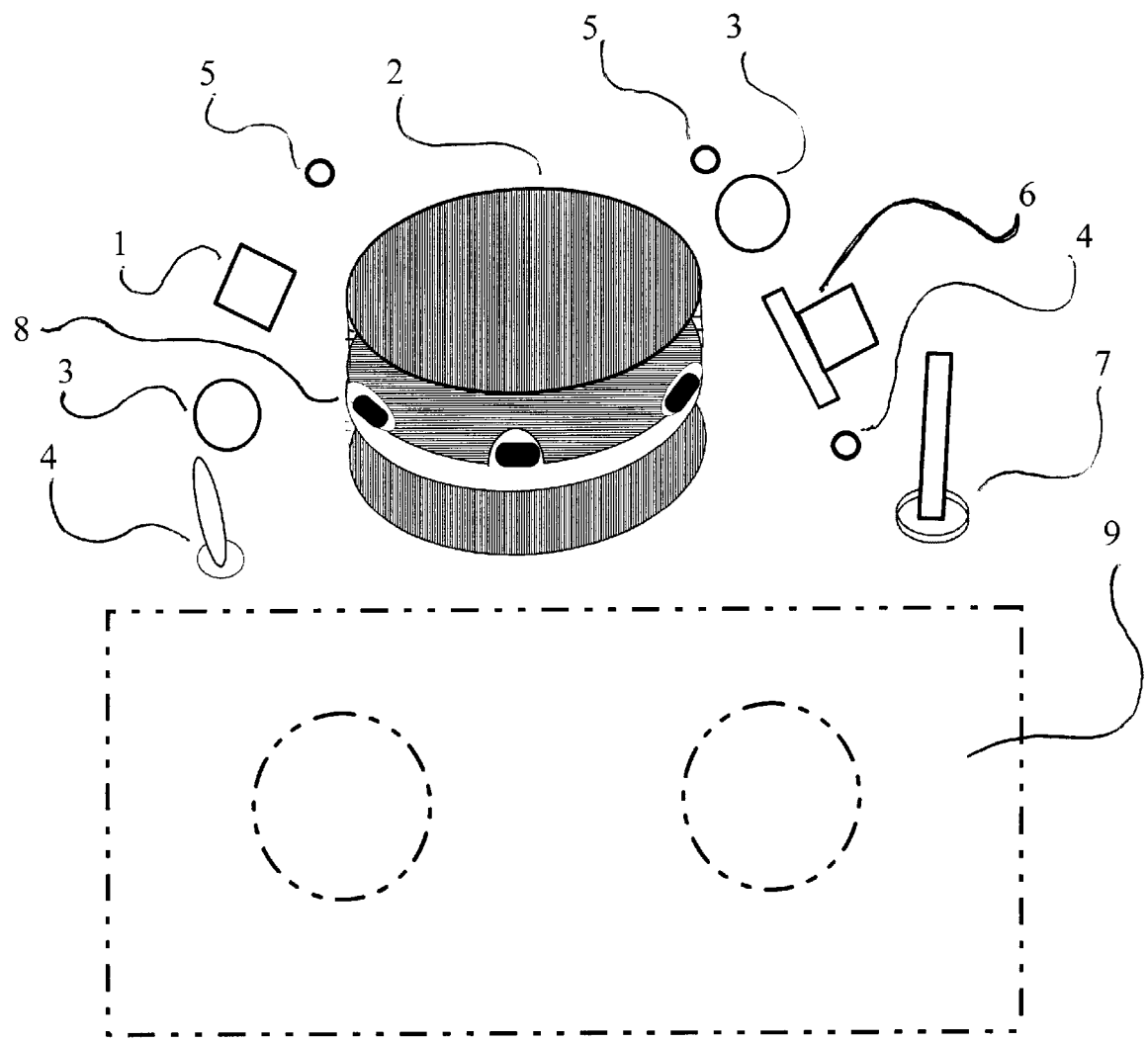

The previously described invented method for cleaning and conditioning tape path surfaces and heads of a tape recorder, is an application for all audio/video tape recorders and tape players having tape path surfaces, including, but not limited to professional video tape recorders/players, home video cassette recorders/players, video tape camcorders, cassette recorders/players and reel to reel audio tape recorders/players, (hereinafter referred to as a VTR/VCR). The invented method of cleaning and conditioning is also a treatment application for electrical connections, with particular attention to, but not limited to the electrical contact surfaces within and upon a VTR/VCR, and related electronic equipment, which includes a cable connection, an electrical contact, a circuit board connection, a PC board, a computer chip, and computer/PC pegs and chip pins; providing a cleaning composition, containing no alcohol, made of a single chain hydrocarbons composition, a reported safest form of chemical solvents for environmental health and safety, and highly recommended for industry research and application, and reported as non-carcinogenic by the EPA; Contacting the tape path and electrical contact surface with the cleaning composition; applying the cleaning composition for at least five minutes to the tape path and electrical contact surface, then wiping and drying the tape path, and electrical contact surface, to remove all traces of the cleaning composition. This is best accomplished by either wiping dry, or in the case of electrical contact surfaces, only, optionally applying pressurized air to dry. The invented VTR/VCR and electronics contact conditioning and cleaning composition consists essentially of a mixture of white mineral oil, in an amount up to 25% of the cleaning composition and a compound selected from the group consisting of mineral spirits, hydrotreated heavy petroleum naphtha, heavy alkylate naphtha and isoparaffinic hydrocarbons having 10–13 carbons in an amount up to 90% of the cleaning composition. The mixture of ingredients in the described invention is not limited to one form of mixture, but may include variations of the above ingredients for different applications. This could include a difference between an industrial strength and consumer strength cleaning composition. The invented method for cleaning and surface conditioning is accomplished by contacting tape path surfaces, heads, and electrical contact surfaces with the above cleaning composition, applying the cleaning composition for approximately five minutes before removal of the cleaning composition. Tape path cleaning and conditioning treatment is applied to the upper and lower drums, the recording heads including flying heads and stationary heads, record and playback heads, erase head, audio and tracking heads, capstan drive pin, rollers, and tape guide pins ( hereinafter referred to as the tape path surface. The invented method of cleaning and conditioning VTR/VCR tape paths, and electrical contact surfaces, is best accomplished by hands application using a very small amount the invented cleaning solution on a fresh, unused technical wipe; preferably made of a soft, lint free, fibrous material, consisting of a paper, or a cloth, or a similar composition, then wiping and drying tape path surfaces and heads to remove all traces of the cleaning composition. Application of the treatment for approximately five minutes, before wiping dry, results in a combination of unexpected and beneficial results. In a clean up step, use a separate, dry wipe to remove all traces of the treatment fluids from tape paths. The invented cleaning and conditioning treatment is both non-corrosive, and non-caustic, contains no alcohol, and is not harmful to any electronic components, including computer chips and other delicate electronic components. It is not required to remove all treatment fluids from electrical contact surfaces in general; but is very important to remove all fluids from video tape paths to prevent tape damage due to grabbing. Any fluids left upon a video tape recorders' tape path are very likely to "grab" the next tape played, due to the high speed of upper head drums. The removal and cleanup of the invented cleaning and conditioning composition is best accomplished by hands application, using a fresh, dry, unused technical wipe, preferably made of a soft, lint free, fibrous material, consisting of paper, or cloth, or similar composition, wiping and drying tape path surfaces and heads to remove all traces of cleaning composition. Apply cleaning composition to VTR/VCR with a lightly moistened wipe, by hand, or wrap treatment wipe around a short, flat object, such as a smooth wooden stick to distribute around drums and difficult to reach areas. Use clean, dry, un-moistened wipes for removal of cleaner treatment from entire tape path, and for final cleanup. Although alcohol can be used to clean VTR/VCR drums, heads and pins before cleaner treatment, it is not necessary. The invented method is an application that will further clean and condition after an optional cleaning of heads, tape path, and electronic connections, with alcohol. The use of pressurized air to clean up VTR/VCR and remove all dust and loose particles is recommended. In addition to cleaning and conditioning, replace worn belts and parts as needed for maximum performance. The following instructions provide the best method for VTR and VCR video and audio tape path cleaning and conditioning treatment with the invention:

1. Expose the metal capstan drive pin for cleaning.

This may require removing the rubber pinch roller assembly to expose the drive pin.

2. Evenly apply invented treatment to both upper and lower drums, including heads.

The invented cleaning and conditioning composition does not evaporate quickly so it will be required to dry in a later step.

3. Evenly clean all heads, rollers and pins in tape path including capstan drive pin described in step 1.

4. Continue to apply invented cleaner to drum assembly, with emphasis on upper drum assembly with flying heads. Although it may appear that nothing is happening, it is important to allow product to remain on parts for approximately (5) five minutes.

The invented treatment is very slippery and will aid in protecting delicate heads in drum assemblies from snagging on treatment wipe. And replace application wipe if it tears to prevent snagging these heads. Upper drums usually require more attention than all the other parts.

5. Using the same application wipe continue to clean drum assembly. Results from deep cleaning and a deoxidization process may show as gray or black specks or stain on the cleaning wipe. This is an expected reaction of the invented method.

6. Continue to clean until the deoxidization results stop. The removed oxidation and dirt will on the application wipe will not reattach. It may be found useful to refold application wipe and continue cleaning the full tape path.

7. Dry off all fluids. Use dry untreated dry wipes to clean up. All fluids must be removed to prevent VTR/VCR from "grabbing" video tape causing loss of tape.

8. Repeat clean up with a second dry wipe to assure removal of all of the invented treatment fluids. Dry the tape path before installing any tape.

9. Reinstall any removed parts from within the tape path, such as the rubber capstan pinch roller. VTR/VCR drums and heads now have a newly conditioned surface and will often require a short break-in procedure. For best results, insert an unused blank tape; but keep in pause position for 10 seconds. It is recommended to load and reload tape, once before playing or recording. It is also preferred to play the tape in scan mode, shuttling the tape back and forth and follow up with a test recording and playback. An optional pressurized air drying of treated parts can be used.

The invented method of cleaning and conditioning treatment lubricates the heads, and the tape path with the invented fluid composition during the treatment, providing an added protection to delicate parts. Then all fluid is removed. This invented method deep cleans, removing dirt, tape oxides and deeply deoxidizes all the heads, drums, pins and rollers.

Using the invented method upon tape path heads and surfaces plus cable connections and electrical contact surfaces cleans, polishes and conditions treated surfaces for a resistance against corrosion and reduces friction upon the treated parts. Benefits from the invented method improves the conductivity of an existing conductive surface. The invented method increases signal transfer at heads, improves playback of both video and audio recordings, including existing recordings. The described treated tape path and electrical contact surfaces are protected by a surface conditioning and polishing of treated surfaces against further oxidation. The invented method will not dissolve lacquer or damage lacquer coated wires; including delicate lacquered wires incorporated into flying video/audio heads. The invented method is a VTR/VCR surface conditioning treatment for glass, metals, including precious metals, aluminum, brass, plastic and rubber. The method is an application to improve the seating of an electrical contact surface to another electrical contact surface, such as with cable connections, circuit board connections, switches, PC pegs, chip pins and computer chips. The resulting surface conditioning causes a reduction in friction to the above described surfaces as a direct result of application and removal of the invented conditioning treatment and cleaner. The invented cleaner, and conditioning treatment, can optionally be packaged, in sealed packets in order to make the invented product convenient, and quickly accessible, to the end user. The packets, available in various form, consist of a tri-layered sealing material having a printable exterior surface of paper, or fibrous material, a center layer of metallic foil, and a plastic lined internal layer. The described packaging materials are sealed usually by heat, and contain the above described application wipes. The wipes are optionally pre-moistened with the invented composition fluid, ready for distribution, and provides a ready to use application convenience. The packaging size can vary according to size and quantity of pre-moistened treatment wipes. This invention is an improvement over existing methods of cleaning and conditioning tape paths of VTRs/VCRs, such as alcohol, and other existing chemical VTR/VCR and head cleaners. The Environmental Protection Agency has recommended research into the area of safer solvents for industrial application. The invented method of tape path and electrical contact surfaces cleaning and conditioning with the provided simple chain hydrocarbons chemistry is an environmental improvement over other existing chemical cleaners. The invented cleaner is a pleasant product to handle, without offending odor, cleans deeper than alcohol, acetone, or other tested, existing cleaners, of which video/audio head, and read/write head enhancement is clearly noted by evidenced improved recordings, and improved play back results, with the greatest results and benefits resulting with VTRs/VCRs having been cleaned historically or regularly with all existing forms of alcohol, including the useful and highly respected isopropyl alcohol; combinations of most chemical cleaners with alcohol, most chemical cleaners without alcohol, acetone, and other cleaners that do not deeply deoxidize tape path drums, heads, and tape contact surfaces, or seal the treated surfaces to resist oxidation and corrosion. The invented conditioning treatment improves the resolution of an existing electronic video/audio heads assembly, without altering the physical characteristics of the existing design. It improves the playback of existing video/audio recording tapes, supporting an improved playback of old, or damaged and otherwise un-playable video/audio recording tapes. The most obvious video improvement is seen with VHS, VCR heads. The most obvious sound improvement is with linear audio heads, The invented method is an application to restore VTR/VCR heads, and electrical contacts, which have been affected by salt air exposure. The above description and examples should not be construed as limitations on the scope of the invention. Many other variations are possible. Accordingly, the scope of the invention is determined by the claims and their legal equivalents.

I claim:

1. A method for cleaning and conditioning tape path surfaces and heads of video and audio equipment and improving the resolution of said heads comprising:

providing a cleaning composition consisting essentially of white mineral oil in an amount up to 25% of the cleaning composition and a compound selected from the group consisting of mineral spirits, hydrotreated heavy petroleum naphtha, heavy alkylate naphtha and isoparaffinic hydrocarbons having 10–13 carbons in an amount up to 90% of the cleaning composition;

applying said cleaning composition to said tape path surfaces and heads;

contacting said tape path surfaces and heads with said cleaning composition for at least 5 minutes; and wiping and drying said tape path surfaces and heads to remove said cleaning composition.

2. A method of claim 1, wherein said video and audio equipment is selected from the group consisting of a video tape recorder (VTR), a video cassette recorder (VCR), a camcorder and a tape recorder.

3. A method of claim 1, wherein said tape path surfaces and heads include drums, recording heads, erase heads, audio heads, tracking heads, play back heads, a capstan drive pin, rollers and tape guide pins.

4. A method of claim 1, wherein said drying of said tape path surfaces and heads is conducted by wiping of said tape path surfaces and heads or applying pressurized air to said tape path surfaces and heads.

5. A method of claim 1, wherein said tape path surfaces and heads have been damaged by salt air exposure.

6. A method of claim 1, wherein said tape path surfaces and heads are made from a material selected from the group consisting of metals, glass, plastic, rubber and lacquers.

7. A method of claim 6, wherein said metals comprise precious metals.

8. A method of claim 1, wherein said applying of said cleaning composition is accomplished using a technical wipe.

9. A method of claim 8, wherein said wipe is made of a lint free, fibrous material.

10. A method of claim 9, wherein said material comprises a paper or cloth.

11. A method of claim 1, wherein said step of wiping and drying is accomplished using a technical wipe.

12. A method of claim 11, wherein said wipe is made of a lint free, fibrous material.

13. A method of claim 12, wherein said material comprises a paper or cloth.

14. A method of claim 1, wherein said step of providing the cleaning composition comprises providing said cleaning composition packed in a sealed packet made of a tri-layered, heat sealable packing material, said material having an exterior layer consisting of paper or fibrous material, a center layer consisting of metallic foil and an internal layer consisting of plastic.

15. A method of claim 1, further comprising a step of precleaning said tape path surfaces and heads by contacting them with an alcohol.

16. A method for cleaning and conditioning surfaces of electrical contacts of audio, video and electronic equipment comprising:
    providing a cleaning composition consisting essentially of white mineral oil in an amount up to 25% of the cleaning composition and a compound selected from the group consisting of mineral spirits, hydrotreated heavy petroleum naphtha, heavy alkylate naphtha and isoparaffinic hydrocarbons having 10–13 carbons in an amount up to 90% of the cleaning composition;
    applying said cleaning composition to said surfaces; contacting said surfaces with said cleaning composition for at least 5 minutes; and
    wiping and drying said surfaces to remove said cleaning composition.

17. A method of claim 16, wherein said surfaces are selected from the group consisting of surfaces of electrical contacts of video tape recorders, video tape players, video cassette recorders, tape recorders and camcorders.

18. A method of claim 16, wherein said applying of said cleaning composition is accomplished using a technical wipe.

19. A method of claim 18, wherein said wipe is made of a lint free, fibrous material.

20. A method of claim 19, wherein said material comprises a paper or cloth.

21. A method of claim 16, wherein said step of wiping and drying is accomplished using a technical wipe.

22. A method of claim 21, wherein said wipe is made of a lint free, fibrous material.

23. A method of claim 22, wherein said material comprises a paper or cloth.

24. A method of claim 16, wherein said step of providing the cleaning composition comprises providing said cleaning composition packed in a sealed packet made of a tri-layered, heat sealable packing material, said material having an exterior layer consisting of paper or fibrous material, a center layer consisting of metallic foil and an internal layer consisting of plastic.

25. A method of claim 1, wherein said steps of applying, contacting and wiping and drying cause at least one of the following:
    removing dirt from said tape path surfaces and heads;
    deoxidizing said tape path surfaces and heads;
    reducing friction of said tape path surfaces and heads;
    polishing said tape path surfaces and heads;
    increasing signal transfer at said heads;
    improving the play back of said video and audio equipment;
    increasing the life of said heads; and
    increasing resistance against rust and corrosion and residue-attaching resistance of said tape path surfaces and heads.

26. A method of claim 16, wherein said steps of applying, contacting and wiping and drying cause at least one of the following:
    removing dirt from said surfaces;
    deoxidizing said surfaces;
    reducing friction of said surfaces;
    polishing said surfaces;
    increasing signal transfer at said contacts;
    increasing conductivity upon said surfaces; and
    increasing resistance against rust and corrosion and residue-attaching resistance of said surfaces.

27. A method of claim 6, wherein said metals comprise aluminum.

28. A method of claim 6, wherein said metals comprise brass.

29. A method of claim 16, wherein said contacts are made from a metal.

30. A method of claim 29, wherein said metal selected from the group comprising a precious metal, aluminum and brass.

31. A method of claim 16, wherein said surfaces of electrical contacts are selected from the group comprising surfaces of cable connections, circuit board connections, switches, PC pegs, chip pins and computer chips.

32. A method of claim 1, wherein said heads are flying heads.

33. A method of claim 1, wherein said heads are stationary heads.

* * * * *